US012180350B2

(12) United States Patent
Salaita et al.

(10) Patent No.: US 12,180,350 B2
(45) Date of Patent: Dec. 31, 2024

(54) STRAIN-ACCOMMODATING MATERIALS COMPRISING PHOTONIC CRYSTALS

(71) Applicant: Emory University, Atlanta, GA (US)

(72) Inventors: Khalid Salaita, Atlanta, GA (US); Yixiao Dong, Atlanta, GA (US)

(73) Assignee: Emory University, Atlanta, GA (US)

( * ) Notice: Subject to any disclaimer, the term of this patent is extended or adjusted under 35 U.S.C. 154(b) by 815 days.

(21) Appl. No.: 17/397,318

(22) Filed: Aug. 9, 2021

(65) Prior Publication Data

US 2022/0042905 A1 Feb. 10, 2022

Related U.S. Application Data

(60) Provisional application No. 63/062,758, filed on Aug. 7, 2020.

(51) Int. Cl.

| G01N 21/31 | (2006.01) |
|---|---|
| C08K 3/22 | (2006.01) |
| C08K 3/36 | (2006.01) |
| C08K 7/24 | (2006.01) |
| C08K 9/02 | (2006.01) |
| C08L 33/26 | (2006.01) |
| G02B 1/00 | (2006.01) |
| C08J 3/075 | (2006.01) |

(52) U.S. Cl.
CPC .................. *C08K 3/22* (2013.01); *C08K 3/36* (2013.01); *C08K 7/24* (2013.01); *C08K 9/02* (2013.01); *C08L 33/26* (2013.01); *G02B 1/005* (2013.01); *C08J 3/075* (2013.01); *C08K 2003/2275* (2013.01); *C08K 2201/011* (2013.01)

(58) Field of Classification Search
CPC ... C08K 3/22; C08K 3/36; C08K 7/24; C08K 2003/2275; C08K 2201/011; G01N 21/31
See application file for complete search history.

(56) References Cited

U.S. PATENT DOCUMENTS

| 8,889,234 | B2 | 11/2014 | Kwon |
| 9,457,333 | B2 | 10/2016 | Kwon |
| 2013/0146788 | A1 | 6/2013 | Yin |
| 2013/0222889 | A1 | 8/2013 | Stroeve |
| 2020/0094501 | A1 | 3/2020 | Min |

FOREIGN PATENT DOCUMENTS

WO 2015130012 9/2015

OTHER PUBLICATIONS

Yixiao Dong Alisina Bazrafshan, Anastassia Pokutta, Fatiesa Sulejmani, Wei Sun, J. Dale Combs, Kimberly C. Clarke, and Khalid Salaita, Chameleon-Inspired Strain-Accommodating Smart Skin, ACS Nano 2019, 13, 9918-9926. (Year: 2019).*

(Continued)

*Primary Examiner* — Bijan Ahvazi
(74) *Attorney, Agent, or Firm* — Emory Patent Group

(57) ABSTRACT

This disclosure relates to non-naturally occurring light reflecting or color changing materials comprising a segmented array of flexible polymers, wherein the segmented array of flexible polymers comprise photonic crystal lattices embedded therein, wherein the segmented array of flexible polymers are themselves embedded within an elastic supporting polymer that maintains a near constant size during chromatic shifting of the photonic crystal lattices.

9 Claims, 6 Drawing Sheets

(56) References Cited

OTHER PUBLICATIONS

Yalan Zhang, Yu Wang, Huan Wang, Ying Yu, Qifeng Zhong, and Yuanjin Zhao, Super-Elastic Magnetic Structural Color Hydrogels Small 2019, 15, 1902198 (1 of 6) (Year: 2019).*
Aguirre et al. Tunable Colors in Opals and Inverse Opal Photonic Crystals, Adv Funct Mater, 2010, 20, 2565-2578.
Bolto et al. Crosslinked poly(vinyl alcohol) membranes, Progress in Polymer Science, 2009, 34, 969-981.
Bu et al. Stretchable Triboelectric-Photonic Smart Skin for Tactile and Gesture Sensing, Adv Mater, 2018, 30, 1800066.
Ding et al. Revealing Invisible Photonic Inscriptions: Images from Strain, ACS Appl Mater Interfaces, 2015, 7, 24, 13497-13502.
Ding et al. Stamping colloidal photonic crystals: a facile way towards complex pixel colour patterns for sensing and displays, Nanoscale, 2015, 7, 1857-1863.
Dong et al. Autoclave-free facile approach to the synthesis of highly tunable nanocrystal clusters for magnetic responsive photonic crystals, RSC Adv., 2016, 6, 64434.
Dong et al. Chameleon-Inspired Strain-Accommodating Smart Skin, ACS Nano, 2019, 13, 9918-9926.
Fukasawa et al. Synthesis and Mechanical Properties of a Nanocomposite Gel Consisting of a Tetra-PEG/Clay Network, Macromolecules, 2010, 43, 4370-4378.
Laponite, BYK Additives & Instruments, Technical Information B-RI 21, Performance Additives, 2014, 24 pages.
Lee et al. Chameleon-Inspired Mechanochromic Photonic Films Composed of Non-Close-Packed Colloidal Arrays, ACS Nano 2017, 11, 11350-11357.
Lu et al. Bio-inspired fabrication of stimuliresponsive photonic crystals with hierarchical structures and their applications, Nanotechnology 27 (2016) 122001, 14 pages.
Park et al. Photonic-crystal hydrogels with a rapidly tunable stop band and high reflectivity across the visible, Optical Materials Express vol. 7, Issue 1, pp. 253-263 (2017).
Snoswell et al. Real-time measurements of crystallization processes in viscoelastic polymeric photonic crystals, Physical Review E 92, 052315 (2015).
Vatankhah et al. Chameleon-like elastomers with molecularly encoded strain-adaptive stiffening and coloration, Science 359, 1509-1513 (2018).
Welch et al. Beyond butterflies—the diversity of biological photonic crystals, Opt Quant Electron (2007) 39:295-303.
Yu et al. Adaptive optoelectronic camouflage systems with designs inspired by cephalopod skins, Proc Natl Acad Sci USA. 2014, 111(36):12998-3003.
Zhang et al. Flexible mechanochromic photonic crystals: routes to visual sensors and their mechanical properties, J. Mater. Chem. C, 2018, 6, 3182.
Zhang et al. Super-Elastic Magnetic Structural Color Hydrogels, Small 2019, 15, 1902198, 6 pages.
Zhao et al. Large-scale ordering of nanoparticles using viscoelastic shear processing, Nat Commun. 2016, 7:11661.

* cited by examiner

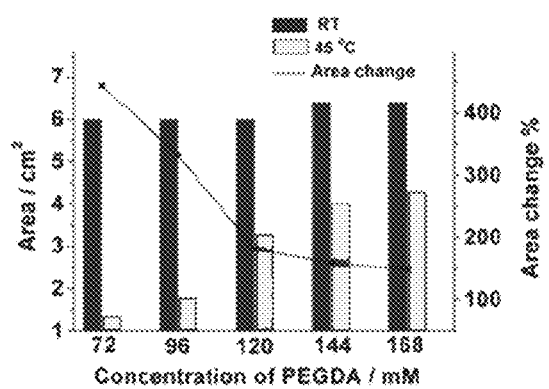
FIG. 2A
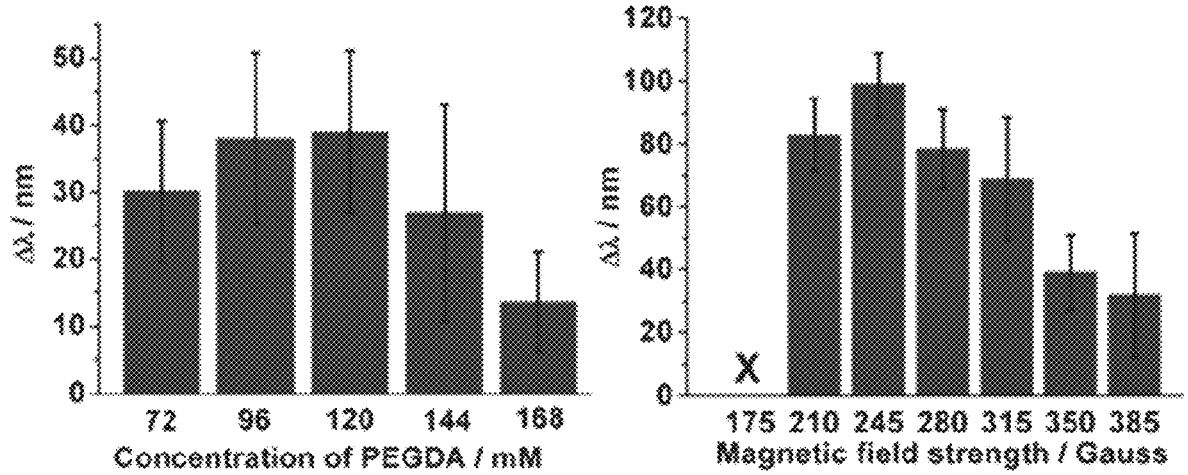
FIG. 2B
FIG. 2C
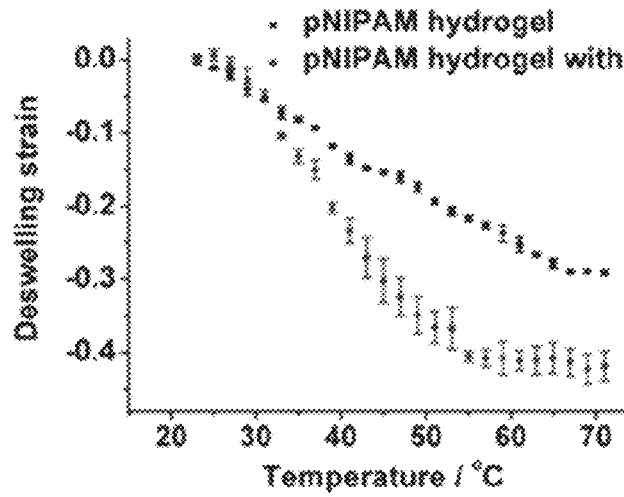
FIG. 2D

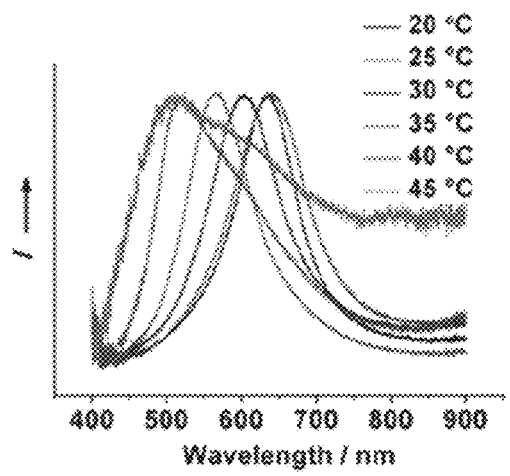
FIG. 2E
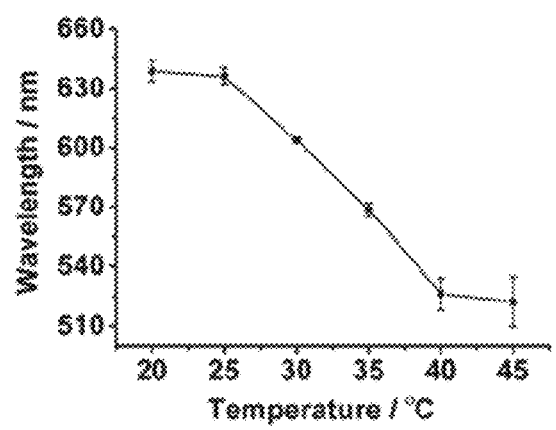
FIG. 2F
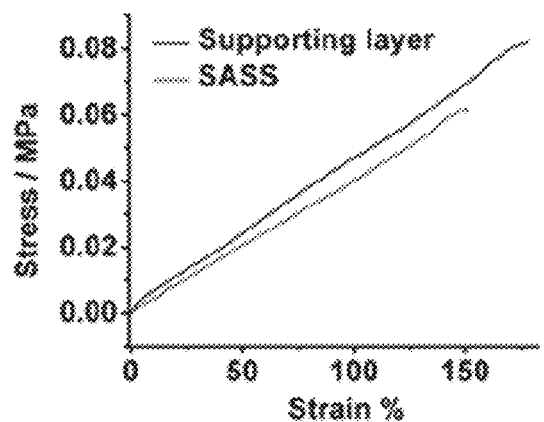
FIG. 2G
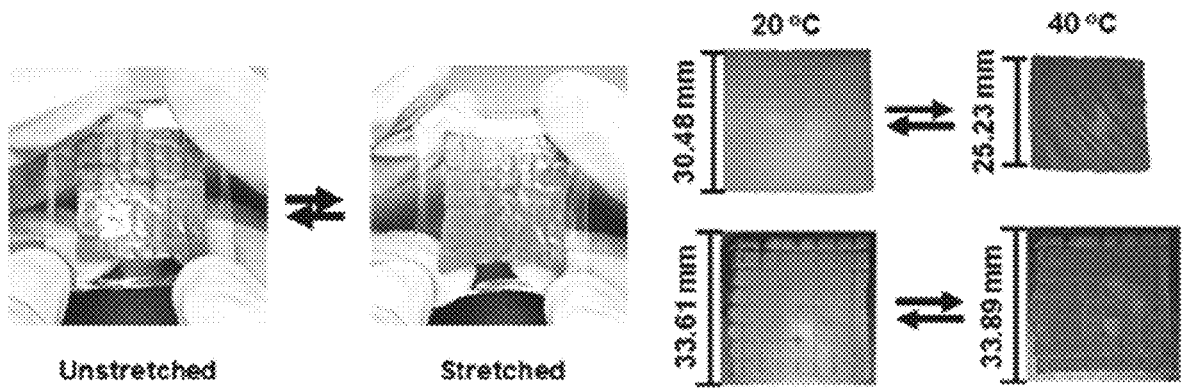
FIG. 2H
FIG. 2I

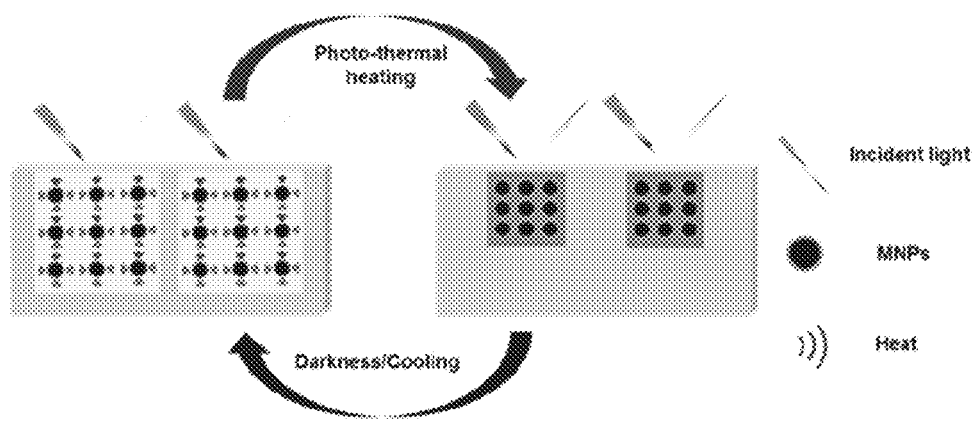
FIG. 3A
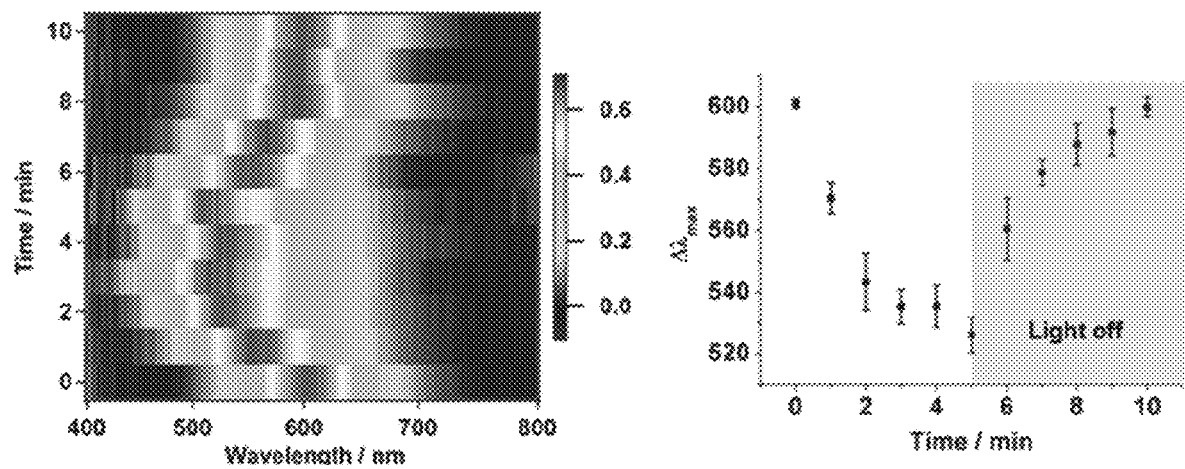
FIG. 3B
FIG. 3C
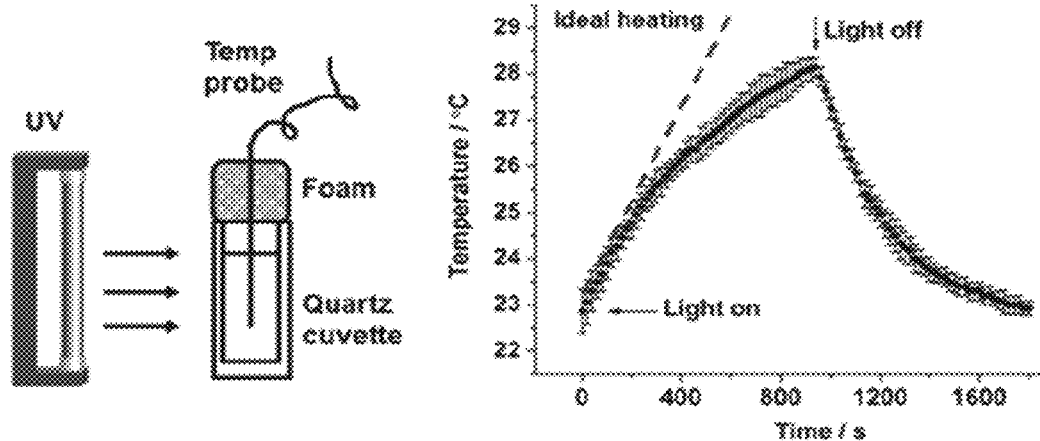
FIG. 3D
FIG. 3E

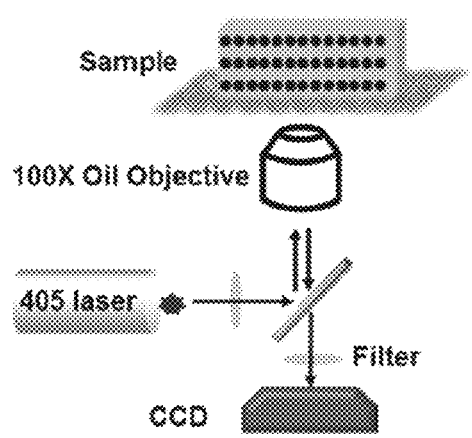
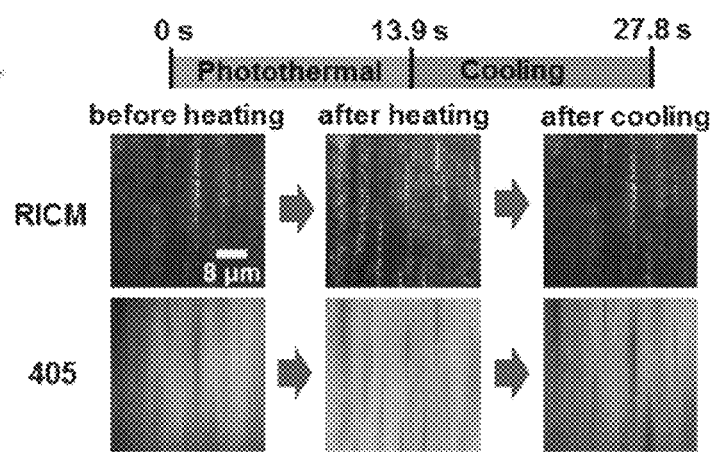
FIG. 4A          FIG. 4B
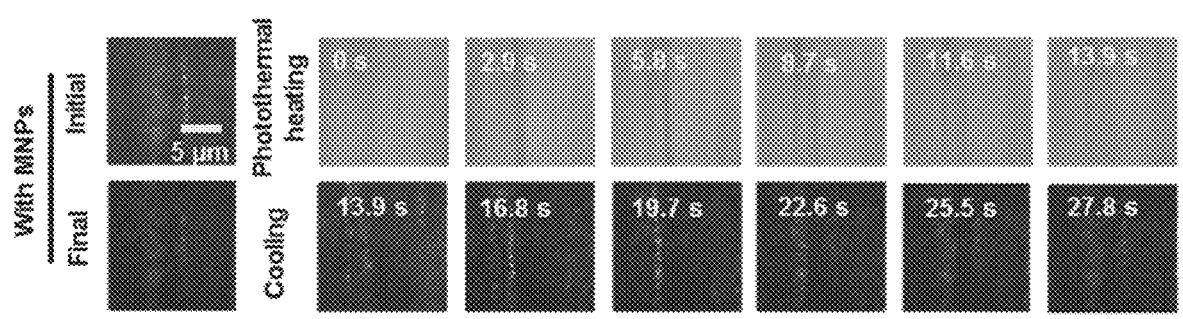
FIG. 4C

STRAIN-ACCOMMODATING MATERIALS COMPRISING PHOTONIC CRYSTALS

CROSS-REFERENCE TO RELATED APPLICATIONS

This application claims the benefit of U.S. Provisional Application No. 63/062,758 filed Aug. 7, 2020. The entirety of this application is hereby incorporated by reference for all purposes.

STATEMENT REGARDING FEDERALLY SPONSORED RESEARCH OR DEVELOPMENT

This invention was made with government support under GM131099 and GM124472 awarded by the National Institutes of Health and HR0011-16-2-0011 awarded by DARPA. The government has certain rights in the invention.

BACKGROUND

There has been significant effort focused on fabricating materials that that can change light reflective properties, such as color, due to structural patterns in the materials referred to as photonic crystals "PCs." The color-changing properties of PCs are employed by a wide-array of living creatures.

Lee et al. report chameleon-inspired mechanochromic photonic films composed of non-close-packed colloidal arrays. ACS Nano, 2017, 11, 11350-11357.

Dong et al. report the synthesis of tunable nanocrystal clusters for magnetic responsive photonic crystals. RSC Adv, 2016, 6, 64434.

Fukasawa et al. report the synthesis and mechanical properties of a nanocomposite gel consisting of a tetra-PEG/clay network. Macromolecules, 2010, 43, 4370-4378.

US Pub. Patent App. No. 20200094501 reports color contact lenses including photonic crystal structures.

References cited herein are not an admission of prior art.

SUMMARY

This disclosure relates to a non-naturally occurring light reflecting or color changing materials comprising a segmented array of flexible polymers, wherein the segmented array of flexible polymers comprise photonic crystal lattices embedded therein providing a layer of photonic crystals, wherein the segmented array of flexible polymers are themselves embedded within an elastic supporting polymer that maintains a near constant size during chromatic shifting of the photonic crystal lattices.

In certain embodiments, this disclosure relates to non-naturally occurring light reflecting or color changing materials comprising a segmented array of flexible polymers, wherein the segmented array of flexible polymers comprise photonic crystal lattices embedded therein providing a light or heat responsive layer of photonic crystals configure to expand and shrink resulting in changed coloration, wherein the segmented array of flexible polymers are themselves embedded within an elastic supporting polymer that maintains a near constant size during chromatic shifting of the photonic crystal lattices.

In certain embodiments, this disclosure relates to color changing material comprising a segmented array of hydrogels, i.e., a plurality of hydrogel areas, wherein the array of hydrogels comprise photonic crystal lattices embedded therein, wherein the segmented array of hydrogels are embedded within an elastic supporting polymer that maintains a near constant size and near constant volume during chromatic shifting of the photonic crystal lattices.

In certain embodiments, the segmented array of flexible polymers or hydrogels includes more than 5×5 (25) areas, or more than 9×9 (81) areas, or more than 13×13 (169) areas.

In certain embodiments, the flexible polymers are hydrogels. In certain embodiments, the hydrogels comprise a copolymer of an acrylate polymer, such as poly(N-isopropylacrylamide), and polyethylene glycol diacrylate. In certain embodiments, the elastic supporting polymer comprises tetra-polyethylene glycol monomers and laponite.

In certain embodiments, the photonic crystal lattices contain ferromagnetic particles. In certain embodiments, the ferromagnetic particles have an iron oxide core. In certain embodiments, the ferromagnetic have a metal core and a silicon shell. In certain embodiments, the ferromagnetic particles have an iron oxide core and a silicon shell. In certain embodiments, the ferromagnetic particles have a total or core diameter of less than 300 nm or less than 400 nm or less than 500 nm.

In certain embodiments, the segmented array of flexible polymers comprise photonic crystal lattices made by a process of crosslinking a hydrophilic polymer having an acrylate group with another acrylate polymer, holding ferromagnetic particles in a magnetic field, and exposing the acrylate polymers to crosslinking conditions.

In certain embodiments, the segmented array of flexible polymers comprise photonic crystal lattices made by a process of crosslinking poly(N-isopropylacrylamide) with polyethylene glycol diacrylate and holding ferromagnetic particles in a magnetic field.

In certain embodiments, the segmented array of flexible polymers comprise photonic crystal lattices made by a process of crosslinking poly(N-isopropylacrylamide) with polyethylene glycol diacrylate, wherein polyethylene glycol diacrylate is at a concentration of 120 mM and holding the ferromagnetic particles in a magnetic field of 245 G and holding ferromagnetic particles in a magnetic field of 245 G.

In certain embodiments, this disclosure relates to methods of monitoring an optical response comprising exposing a color changing material disclosed herein to light and detecting an optical response on a segment of the material, e.g., a segment of a segmented array. In certain embodiments, exposing the material to light is sunlight.

In certain embodiments, this disclosure relates to methods of monitoring an optical response comprising exposing a light or color changing material disclosed herein to heat and detecting an optical response on a segment of the material, e.g., a segment of a segmented array.

In certain embodiments, this disclosure relates to multi-layered, light or color changing, strain-accommodating composite material comprising on a substrate a first photonic crystal array layer comprising a first hydrogel matrix containing strain-responsive photonic crystals embedded in said hydrogel matrix, being divided into sections, which are able to expand and contract, and a second supporting layer comprising a second hydrogel matrix wherein the second hydrogel matrix is interspersed between sections of said first layer such that the composite maintains a constant surface area despite the expansion and contraction of the sections of the first layer.

In certain embodiments, the second layer is comprised of tetra-polyethylene glycol linked together by amide bonds providing a tetra-polyethylene composite. In certain embodiments, the tetra-polyethylene composite is doped with a nanoclay. In certain embodiments, that nanoclay is laponite.

In certain embodiments, the photonic crystal array is constructed by crosslinking polyethylene glycol diacrylate and with another acrylate such as poly(N-isopropylacrylamide) as the hydrogel, which holds monodispersed magnetic nanoparticles. In certain embodiments, the magnetic nanoparticles have a shell comprising $SiO_2$ with a core of $Fe_3O_4$.

BRIEF DESCRIPTION OF THE SEVERAL VIEWS OF THE DRAWINGS

FIG. 2A shows a plot relating the cross-linker (PEGDA) concentration in pNIPAM PC gels to their area before and after heating to 45° C. (a 350 G magnetic field was applied during polymerization). The righty-axis represents the area change % upon heating for each composition.

FIG. 2B shows a plot showing the change in reflection $λ_{max}$ for the samples. The Amax was determined using reflection spectra of standalone PC films at RT and 45° C.

FIG. 2C shows a plot of reflection Amax (collected at RT and 45° C.) for responsive pNIPAM PCs polymerized under different magnetic field strengths. These gels were synthesized with PEGDA (120 mM).

FIG. 2D shows a plot of temperature-dependent strain of pNIPAM hydrogels prepared without (black) and with magnetic nanoparticles.

FIG. 2E shows data on the normalized reflection spectra of a SASS sample collected at different temperatures.

FIG. 2F shows $λ_{max}$ of reflectance for SASS samples as a function of temperature.

FIG. 2G shows representative uniaxial tensile measurement of a SASS sample and a sample of a standalone film comprised of the strain-accommodating polymer.

FIG. 2H shows photographs demonstrating the elasticity of SASS and its strain-induced color change.

FIG. 2I shows photographs showing the chromatic response of a traditional responsive pNIPAM PC film (upper) triggered by adjusting the temperature (20 to 40° C.) compared to the chromatic response of SASS (lower) under the same conditions. The dimensions of the materials in the initial and final states are provided to the left of each image.

FIG. 3A shows a schematic of the light-responsive mechanism of SASS. Exposure to white light induces photothermal heating and a concomitant spectral shift in the peak absorbance as the spacing within the PC decreases. Cessation of light returns SASS to its original state.

FIG. 3B shows a two-dimensional color map depicting the spectral shift of SASS as a function of time when exposed to a white light LED source (light was on 0-5 min and off 5-10 min).

FIG. 3C shows data on reflection max of illuminated SASS samples.

FIG. 3D is a schematic of equipment setup used for measuring the photothermal conversion efficiency. A UV light source was used to illuminate a dispersion of magnetic nanoparticles while the solution temperature was measured.

FIG. 3E is a plot of solution temperature during exposure of dispersed magnetic nanoparticles (MNP, $Fe_3O_4$—$SiO_2$) to UV light as a function of time. The error bars represent the standard deviation from three independent samples. The dashed line indicates the ideal heating of the dispersion and provides the heating rate of the sample.

FIG. 4A shows a schematic of the microscope and sample setup for in situ observation of SASS. Irradiation with a 405 nm laser initiates photothermal heating and remodels MNP organization.

FIG. 4B shows images of aligned MNPs in the responsive layer captured upon initiation of photothermal heating (0 s), at the end of heating (13.9 s), and at the end of cooling (27.8 s).

FIG. 4C shows time-lapse images of aligned MNPs in the responsive layer collected during photothermal heating with a 405 nm laser and cooling with the laser off.

DETAILED DESCRIPTION

Figure 1A:
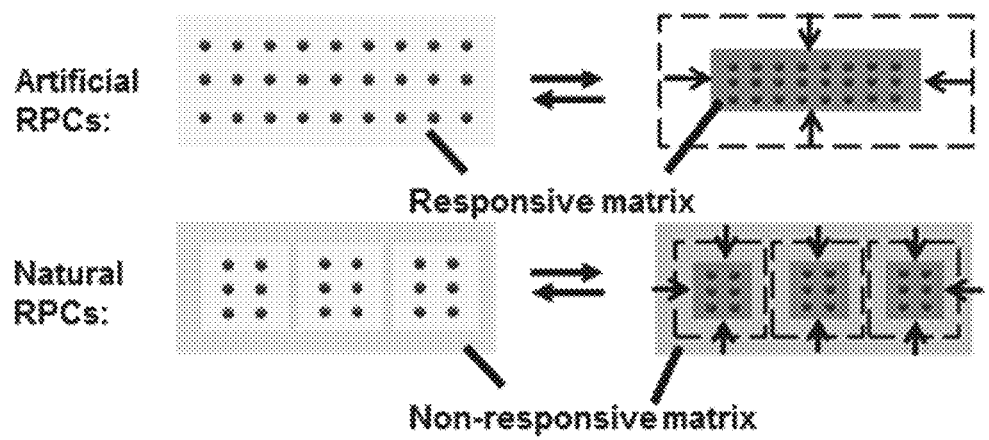
FIG. 1A shows a schematic comparing design of artificial responsive photonic crystals (PCs) to responsive photonic crystals utilized by nature. The dots represent the photonic crystals, the different shades represent the swollen and deswollen states of the responsive hydrogel, respectively.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of medicine, organic chemistry, biochemistry, molecular biology, pharmacology, and the like, which are within the skill of the art. Such techniques are explained fully in the literature.

It must be noted that, as used in the specification and the appended claims, the singular forms "a," "an," and "the" include plural referents unless the context clearly dictates otherwise. In this specification and in the claims that follow, reference will be made to a number of terms that shall be defined to have the following meanings unless a contrary intention is apparent.

As used in this disclosure and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") have the meaning ascribed to them in U.S. Patent law in that they are inclusive or open-ended and do not exclude additional, unrecited elements or method steps.

"Consisting essentially of" or "consists of" or the like, when applied to methods and compositions encompassed by the present disclosure refers to compositions like those disclosed herein that exclude certain prior art elements to provide an inventive feature of a claim, but which may contain additional composition components or method steps, etc., that do not materially affect the basic and novel characteristic(s) of the compositions or methods, compared to those of the corresponding compositions or methods disclosed herein.

The term "elastic" refers to capable of stretching or bending so as to return to an original shape or size when force is released.

The term "flexible" refers to capable of stretching or bending without breaking, with or without elasticity.

As used herein, a "hydrogel" refers to polymers that bind to water forming a gel. Hydrogels typically contain large percentage of monomers with chemical groups that hydrogen bond with water such as monomers that contain hydroxyl groups, carboxyl groups, alkyl esters, and combinations thereof. The polymers are typically joined by the linear or branched reaction of terminal chemical groups, such as linear or branched polyethylene glycol. Acrylate monomers are esters which contain vinyl groups. The vinyl groups form covalent bonds by free-radical reactions. Acrylate hydrogels can be produced from monomers such as 2-hydroxyethyl acrylate. A hydrogel may be a hydrophilic acrylic hydrogel or a hydrophilic silicone-based hydrogel or combination of thereof.

Laponite refers to layered lithium magnesium sodium silicates which are typically colloidal crystals having dimensions of less than 500 nm. Laponite contains silicate layers and magnesium ions layers. Laponite crystals arrange into stacks which are held together electrostatically by sharing of sodium ions in the interlayer region between adjacent crystals. A unit cell is repeated with a disc-like shape having a thickness approaching about 1 nm and a diameter of about 25 nm. A small percentage of magnesium ions are substituted with lithium ions which results in an approximate empirical formula: $Na^+_{0.7} [(Si_8 Mg_{5.5}Li_{0.3})O_{20}(OH)_4]^{-7}$. Certain laponites have the ability to form clear colorless gels when disperse in water.

Photonic Crystals

Photonic crystal structures are fabricated with a spatial periodicity, patterns, which can be a material or absence of material. One can fabricate a photonic crystal exhibiting different periodicities within 2D and 3D structures. Photons have a characteristic wavelength (k), which varies with photon energy and can propagate through the photonic crystal, or such that certain photons are prevented from propagation there-though, by means of a photonic bandgap i.e. a frequency window in which propagation of the photons of a particular frequency is prevented. Photonic crystals can exhibit full-visible-wavelength structural colorations. In certain contexts, the periodicity of the structures in photonic crystals is controlled between 300 nm and 700 nm corresponding to full-visible-wavelength photonic bandgaps.

As an example, a plurality of particles are dispersed in a polymer or hydrogel and encapsulated into the polymer or hydrogel as separate particles, and each of the particles may be spaced apart at a predetermined distance from each other to form a regularly arranged dispersed phase in the polymer or hydrogel resulting in a photonic crystal structure. In this case, the photonic crystal structure may show a reflection color corresponding to the band gap of the photonic crystal. The reflection color of the photonic crystal structures may be adjusted by the index of refraction of the particles, an index of refraction of a background material, the size of particles, the gap between the particles, and the like.

Strain-Accommodating Composite Materials

Living creatures have evolved the ability to change color, such as chameleons. The ability to rapidly change color is beneficial for camouflage, mating, and intimidating predators. Coloration in these organisms is described as "structural" because it is generated by periodic arrays of nano- and microstructures, photonic crystals (PCs), which generate color through optical interference effects. Unlike common coloration strategies using dyes and pigments, which rely on wavelength-specific absorption of light, structural coloration is immune to photobleaching and can be easily manipulated by controlling particle spacing. The periodic distance between elements in photonic crystals dictates the color of the material. Accordingly, color change for many of these species employs responsive matrices that tune the spacing of the photonic crystals.

Such color-changing materials, which may be described as "smart skins", are envisioned useful in various applications ranging from camouflage and communications to anti-counterfeiting and biosensing. Adjusting the color of synthetic photonic crystals mirrors that of natural systems which sometimes involves modulating the periodicity of the photonic crystal lattice. One strategy is to embed the photonic crystals in a hydrogel or flexible polymer matrix that responds to an input by expansion or contraction, resulting in a shift in the photonic crystal periodicity due to changes in physical position the photonic crystals. However, these changes lead to structural instability and buckling of the material. For example, a 20% or greater linear expansion or contraction (strain) of responsive photonic crystals are required to produce a significant color shift ($\Delta\lambda=100$ nm).

During time-lapse imaging of chameleon skin, it was noticed that only a small fraction of the skin cells contains guanine photonic crystal arrays, while the remainder of the skin cells are colorless. The chameleon skin tissue includes nonresponsive cells that may contribute to reduce the global volume change during chromatic response. The contrast between artificial responsive photonic crystals and natural responsive photonic crystals, is that natural responsive photonic crystals employ a tunable photonic crystal element embedded within a matrix that lacks photonic crystals and accommodates the strain. This structural difference leads to a significant reduction in the total change in volume of the material, while maintaining the observable dynamic coloration.

A strain-accommodating composite material or strain-accommodating material (SASS) containing photonic crystals is reported herein. The total volume of the composite material structure is maintained because the contraction of the photonic crystal lattice is accommodated by local elastic deformation of a supporting polymer layer. The materials display excellent mechanical properties including high stretchability and good mechanical strength that is primarily dependent on the supporting layer. The composite material demonstrates a generalizable concept of how to create responsive photonic crystals that maintain constant size during chromatic shifting. Furthermore, strain-accommodating composite material color change can be optically triggered and films rapidly changed color upon exposure to ambient sunlight (t=10 min). These features suggest the potential utility of strain-accommodating composite material in applications such as camouflage and anti-counterfeiting.

Photonic Crystals Embedded in Hydrogels

Figure 1B:
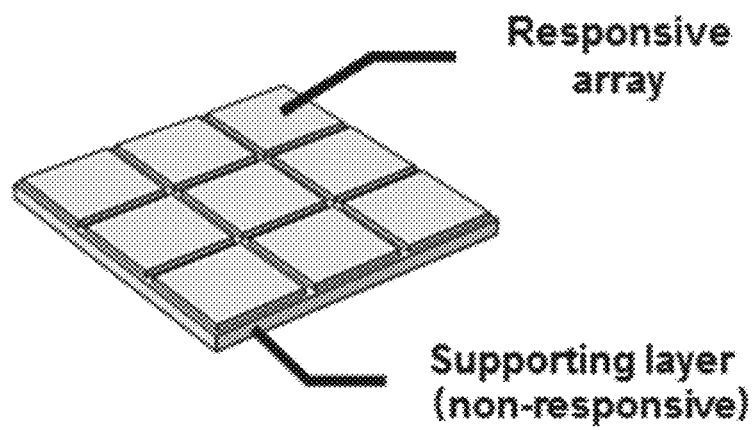
FIG. 1B illustrates a responsive hydrogel array on top of a supporting layer that is nonresponsive.
Figure 1C:
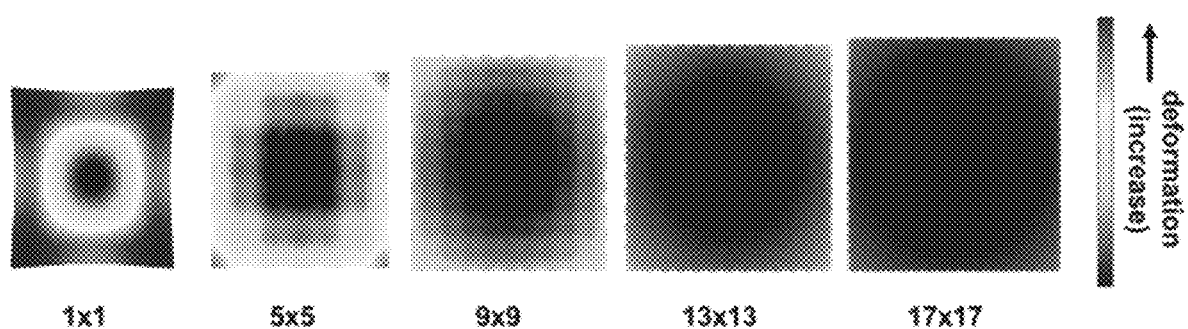
FIG. 1C shows a rendering of a model mapping the deformation of a bilayer material with a supporting nonresponsive layer and a responsive PC upper layer divided into sections with a polymer layer as a function of the number of squares in the responsive PC array layer.

A model was created with a patterned array of responsive photonic crystals in hydrogels were embedded within a nonresponsive supporting polymer layer (FIGS. 1A and 1B). The geometry of the model was such that the responsive photonic crystal elements were localized to the top face of the material. Young's modulus of the two materials were fixed to assume a 50% change in length of the responsive layer. A single planar layer of responsive hydrogel placed atop a supporting layer led to significant strain and deformation at the edges (FIG. 1C, 1×1 case). Note that a free-standing responsive hydrogel film displays the expected deformation. However, when the responsive layer is segmented into arrays of squares, modeling predicts a significant dampening of the deformation/strain that is associated with increasing the number of segments (FIG. 1C, 1×1, 5×5, 9×9, 13×13, and 17×17 cases). This reduction in deformation diminishes as n increased from 13×13 to 17×17 as the SASS material showed minimal deformation with n=17. Plots of the von Mise forces applied on a chosen plane of the supporting layer as a function of the number of square arrays predict a monotonic relationship, where the more finely patterned responsive polymer structure displayed the lowest displacement and average force. Note that this conclusion holds as one varies the Young's modulus of the responsive and supporting layers and is not specific to the values shown in these representative modeling results. Therefore, the models predict that embedding a finely segmented responsive photonic crystal layer within an elastic supporting layer will greatly diminish the global strain.

Figure 1D:
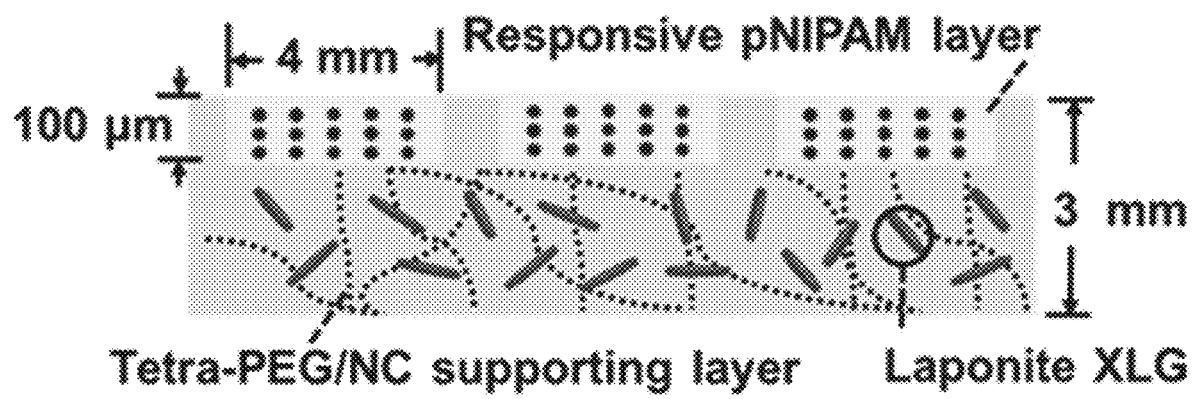
FIG. 1D shows a schematic of a strain-accommodating composite material or strain-accommodating "smart skin" (SASS).
Figure 1E:
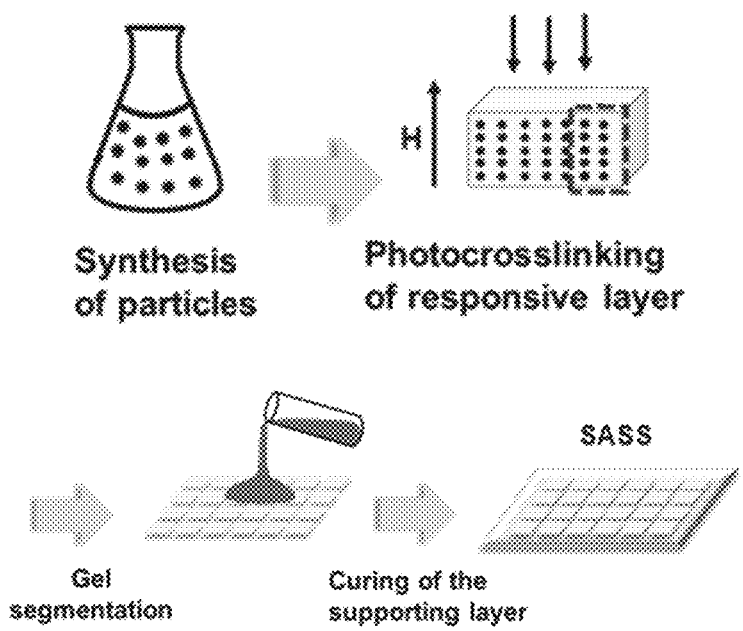
FIG. 1E shows a flow diagram illustrating the steps used in fabrication and representative structures of the magnetic nanoparticles and their organization within the responsive PC array.

A strain-accommodating composite material was fabricated as shown in FIGS. 1D and 1E. The responsive photonic crystal layer was composed of monodisperse $Fe_3O_4$—$SiO_2$ (core-shell) particles (180 nm diameter) organized periodically using an external magnetic field and confined within a photo-cross-linked poly(N-isopropylacrylamide) (pNIPAM) polymer. For optimal design of a strain-accommodating composite material, a supporting polymer was selected that is nonresponsive while displaying robust mechanical elasticity. Tetra-polyethylene glycol (PEG) doped with a nanoclay (Laponite XLG) was used to create a supporting hydrogel layer.

To fabricate the material, $Fe_3O_4$—$SiO_2$ nanoparticles were mixed with a pNIPAM precursor solution, (a polyethylene glycol diacrylate (PEGDA) cross-linker, riboflavin photoinitiator, and NIPAM monomer), and while applying a magnetic field, UV light was used to cross-link the hydrogel, thus locking nanoparticles into defined periodic arrays. Subsequently, a mold was used to create a square array of responsive photonic crystal hydrogels (4×4 mm squares, spaced by 0.5 mm). Finally, the tetra-PEG supporting layer precursor was cured onto the responsive photonic crystal array at room temperature. Cross-section scanning electron microscopy (SEM) imaging of the responsive photonic crystal layer confirmed a periodic chain structure formed by the magnetic nanoparticles (MNPs—$Fe_3O_4$—$SiO_2$), which generates the colorful Bragg diffraction of the sample.

To optimize the chromatic shift of the responsive photonic crystal layer, the mechanical properties were tested by changing cross-linker concentration tuning the swelling/deswelling ratio (FIG. 2A) and generating a maximal chromatic shift (FIG. 2B). Optimization was performed using a reflection-mode spectrometer to record the chromatic shift of PC films in response to thermal heating (45° C.). An intermediate concentration of cross-linker (120 mM PEGDA) produced the greatest magnitude of chromatic shift while minimizing area change. Additionally, optimization of magnetic field strength during synthesis is shown in FIG. 2C. If the magnetic field was too strong (385 G), the peak wavelength shift was diminished likely because the periodic distance between particles approaches a minimum, and the collapse of the responsive hydrogel can no longer reduce interparticle distance further. On the contrary, if the magnetic field is too weak (175 G), no color is observed since the field strength is not sufficient to assemble photonic crystals (FIG. 2C). Therefore, a protocol using 245 G produced a maximum chromatic shift. These experiments provided the optimal parameters for fabricating the responsive photonic crystal hydrogel.

Using these optimized conditions, the thermally induced volume transition of photonic crystals and non-photonic crystals containing responsive films were measured, as shown in FIG. 2D (120 mM PEGDA, 245 G). Photonic crystal gels containing the MNPs displayed a sharper and more significant thermally induced deswelling strain compared to the pNIPAM films lacking the MNPs. This may be due to the strong UV absorption cross-section of MNPs which impacts UV-initiated radical polymerization. Note that the volumetric transition of these films is broader compared to that of conventional pNIPAM films, which is likely due to the PEG chains in the cross-linker (PEGDA) that modulate dehydration of the hydrogel (FIG. 2D). The data in FIG. 2A support this conclusion since gels with higher PEGDA concentrations display lower deswelling ratios.

Representative reflection spectra and plots of the peak reflection wavelength versus temperature of the as-prepared strain-accommodating composite material or strain-accommodating "smart skin" (SASS) samples show a clear thermochromatic shift (FIGS. 2E and 2F). The heat-triggered response of the SASS film was similar to that of the responsive photonic crystal films, suggesting that the SASS architecture did not significantly modulate the transition temperature. However, compared to the mechanical strength of conventional pNIPAM hydrogels, which display rupture forces of a few kPa, SASS displayed superior mechanical strength. Specifically, uniaxial tensile testing (FIG. 2G) showed that SASS has a rupture force of 60 kPa with a strain of 1.5. This was primarily driven by the mechanical properties of the supporting layer, which similarly had an 83 kPa rupture force with a strain of 1.8. SASS samples could be handled manually and displayed a color change upon stretching (FIG. 2H). Note that the chromatic shift generated by the $Fe_3O_4$—$SiO_2$ particle chains is sensitive to the orientation of the mechanical strain. Given that the thermal or optically triggered deswelling response generates in-plane forces, on strains parallel to the film were analyzed. One can apply an external strain that is perpendicular to the film, and such forces can lead to an opposite red-shift in the reflection peak of the material.

SASS displayed significant strain-accommodating behavior, as was especially clear when comparing its volume transition to conventional responsive photonic crystal films (FIG. 2I). To illustrate the difference, SASS and conventional responsive photonic crystal films were sandwiched between two plastic petri dishes such that only in-plane deformations were allowed. To the best of our ability to measure the dimensions of the SASS sample, its size was identical following heating-induced chromatic shifting, while the length of the conventional responsive photonic crystal film was reduced by ~23% after responding to the same heating source.

In addition to its thermo-responsive properties, another intriguing feature is light-responsive behavior. Due to the strong light absorption of magnetite nanoparticles, illumination of was tested to determine if this would also trigger a chromatic response (FIG. 3A). Upon exposure to a hand-held white light LED source, a rapid and reversible reflectance peak shift was observed that mirrored the response to thermal heating (FIGS. 3B and C). In the samples tested, the reflection $\lambda_{max}$ shifted from 600 nm to 525 nm within a few minutes of illumination. To further quantify the photothermal conversion efficiency of MNPs, a calibrated 370 nm light source with ~20 mW/cm$^2$ intensity was used to heat an aqueous dispersion of MNPs in a quartz cuvette (schematic shown in FIG. 3D). As plotted in FIG. 3E, the photothermal ideal heating rate can be inferred by extrapolating a tangential line to the initial phase of the heating curve. Combining this data, a conversion efficiency of 81.8% was calculated.

Experiments were performed to validate the dynamic remodeling of the photonic crystal arrays within the responsive hydrogel film upon illumination. To achieve this, high-resolution in situ optical microscopy was employed to excite and simultaneously image the photonic crystal layer (FIG. 4A). Exciting the sample using a 405 nm laser coupled with a quad cube filter set (405/488/561/647 nm) revealed the weak autofluorescence of the hydrogel. By happenstance, continuous illumination in the 405 nm channel also triggered photothermal heating, localized deswelling of the SASS film, and reorganization of the photonic crystal microstructure (FIG. 4B). Conveniently, the nanochain structure has significant scattering when imaged using a 535 nm reflection interference contrast microscopy (RICM) filter set. This allowed for concurrent imaging of the photonic crystal nanostructures along with the surrounding responsive hydrogel during photothermal heating and cooling (FIG. 4C). The photonic crystal arrays (RICM channel) were anti-localized with the polymer hydrogel (405 nm channel). End points and time-lapse images recording a single photothermal heating/cooling cycle are shown in FIGS. 4B and 4C. In the time-lapse images, the heating phase (0-13.9 s) was recorded using the 405 nm channel, while the cooling phase (13.9-27.8 s) was captured in the RICM channel. The photonic crystal chains are displaced and indeed go out of focus due to the isotropic (3D) nature of deswelling. Importantly, the images comparing the positions of the nanochain structure before and after the heating/cooling cycle demonstrate that the SASS microstructure recovers to its initial configuration.

To confirm that the photothermal effect was exclusively attributed to absorption by $Fe_3O_4$—$SiO_2$ particles rather than other components, SASS films were fabricated doped with pure silica particles lacking the $Fe_3O_4$ core and compared the time-dependent PC array displacement in SASS samples to that of films with silica nanoparticles. The lack of response in the silica nanoparticle-containing samples confirms the key role of magnetite in driving the light-triggered chromatic response of SASS.

SASS chromatic response could also be spatially controlled using localized illumination. To demonstrate this capability, a 532 nm laser was focused onto a 2 mm diameter spot on the SASS sample at an angle of 50°, and a smart phone camera was used to record the chromatic change perpendicular to the sample. The sample drastically changed color within a few seconds of laser illumination, and the color change was localized to the spot of irradiation. The response was quantified by RGB analysis of the images. An increase in blue intensity was observed with a concomitant decrease in both red and green intensity. This response is consistent with the expected blue shift in the reflection spectra after deswelling. This result suggests potential applications for SASS involving dynamic chromatic patterning.

Neon tetra fish are well known for their light-responsive behavior, where the lateral stripes display different structural colors after brief exposure to sunlight. To mimic this response, experiments were performed to determine whether SASS is sensitive to natural sunlight. A 10 min exposure to sunlight triggered an observable chromatic shift. Specifically, the SASS reflection max shifted from 622±2.2 nm to 573±7.7 nm for samples fabricated with 210 nm diameter MNPs. The response triggered by sunlight was reversible, as the amplitude of the chromatic shift (48±9.6 nm) did not change significantly over the course of six illumination/cooling cycles. The range of the max shift response could also be tuned by employing MNPs of a different diameter. For example, particles with a 180 nm diameter showed a reflection max of 556±10.1 nm that reversibly shifts to 504±5.3 nm upon sunlight exposure. Further mimicking the neon tetra fish response, SASS were fabricated films shaped like a fish. After a 10 min exposure to natural sunlight, the SASS film shifted from orange to green, while the overall size remained constant, as determined to the best of our abilities.

To demonstrate camouflage behavior, a leaf-shaped SASS sample was fabricated and arranged together alongside real leaves. After exposure to sunlight, the color of the SASS "leaf" shifted from orange to green and was camouflaged among the real leaves. Again, a key feature enabling camouflage is that the size of the "leaf" remained constant during chromatic shifting.

The SASS design solves the long-standing problem of mechanical buckling and instability of conventional responsive photonic crystal hydrogels. SASS is a two-component polymer material where a segmented responsive photonic crystal hydrogel is embedded within a supporting polymer that accommodates the strain arising from the volume transition. By optimizing cross-linker concentration and magnetic field strength, a strong and reversible heat/light triggered optical response in SASS was demonstrate. High-resolution optical microscopy confirms light-triggered local deswelling and chromatic response of the SASS film. Moreover, SASS chromatic response can be controlled in space and time using a focused laser beam. Note that the resolution of patterning is limited by the dimensions of the illumination spot, the rate of gel response, and the thermal diffusion coefficient within the sample. SASS is sensitive to natural sunlight and can be molded into various geometries to aid in biomimicry. This suggests potential applications in camouflage, signaling, and anti-counterfeiting.

Methods of Use

In certain embodiments, this disclosure relates to methods of monitoring an optical response comprising exposing a color changing material disclosed herein to light and measuring or detecting an optical response on a segment of the material, e.g., a segment of a segmented array. In certain embodiments, exposing the material to light is sunlight.

In certain embodiments, this disclosure relates to methods of monitoring an optical response comprising exposing a color changing material disclosed herein to heat and measuring or detecting an optical response on a segment of the material, e.g., a segment of a segmented array.

In certain embodiments this disclosure relates to a photonic crystal material disclosed herein conjugated to specific binding agents, ligands, receptors, or antibodies. In certain embodiments, this disclosure relates to methods of detecting analytes wherein analytes are reacted with the antibodies attached to the photonic crystal hydrogel films, followed by measuring or detecting a light signal or change of color, where a change indicates the binding of the analyte to the antibody. The analyte may be from a sample, and the sample suspected of containing analyte is mixed with the photonic crystal material. As a result of the antibody-analyte complex forming on the photonic crystal material, e.g., hydrogel film, a reflection peak will shift when compared to an observation without antibody binding. In certain embodiments, a secondary antibody is further added after the reaction of the analytes and the antibody, so as to increase the degree of light change from of the photonic crystal.

In certain embodiments, contact lenses may contain a material disclosed herein. In certain embodiments, the photonic crystals provide color to the contact lens. In certain embodiments, the photonic crystal structures may be disposed in an annular peripheral zone of the contact lens. In certain embodiments, the contact lens includes an optical zone through which a contact lens wearer's line of vision passes, and an annular peripheral zone including a plurality of photonic crystal structures dispersed around the optical zone. Because a user's line of vision passes through the optical zone, a hydrogel serving as a material of the contact lens is disposed in the optical zone. Also, because the annular peripheral zone is a zone through which the line of vision of a user does not pass, the annular peripheral zone may be used to realize an aesthetic effect. The plurality of photonic crystal structures may be disposed to be dispersed in the annular peripheral zone.

The invention claimed is:

1. A non-naturally occurring material comprising,
a segmented array of flexible polymers,
wherein the segmented array of flexible polymers comprise photonic crystal lattices embedded therein providing a layer of photonic crystals, the flexible polymers comprise a copolymer of poly(N-isopropylacrylamide) and polyethylene glycol diacrylate; and
wherein the segmented array of flexible polymers are embedded within an elastic supporting polymer that maintains a near constant size during chromatic shifting of the photonic crystal lattices, the elastic supporting polymer comprises tetra-polyethylene glycol hydrogel and nanoclay.

2. The material of claim 1, wherein the segmented array of flexible polymers includes more than 25 areas.

3. The material of claim 1, wherein the flexible polymers are hydrogels.

4. The material of claim 1, wherein the photonic crystals are ferromagnetic particles.

5. The material of claim 4, wherein the ferromagnetic particles have an iron oxide core and a silicon shell.

6. The material of claim 4, made by a process of cross-linking poly(N-isopropylacrylamide) with polyethylene glycol diacrylate, wherein polyethylene glycol diacrylate is at a concentration of 120 mM and holding the ferromagnetic particles in a magnetic field of 245 G.

7. A method of monitoring an optical response comprising exposing the material of claim 1 to light and detecting an optical response on a segment of the segmented array.

8. The method of claim 7, wherein the exposing the material to light is sunlight.

9. A method of monitoring an optical response comprising exposing the material of claim 1 to heat and detecting an optical response on a segment of the segmented array.

* * * * *